United States Patent [19]

Dornstetter et al.

[11] Patent Number: 5,128,925
[45] Date of Patent: Jul. 7, 1992

[54] PROCESS FOR THE PSEUDO-SYNCHRONIZATION OF A TIME MULTIPLEXING COMMUNICATION NETWORK AND USES THEREOF

[75] Inventors: Jean-Louis Dornstetter, Rocquencourt; Michel Mouly, Vanves, both of France

[73] Assignee: Matra Communication, Quimper, France

[21] Appl. No.: 508,575

[22] Filed: Apr. 13, 1990

[30] Foreign Application Priority Data

Apr. 25, 1989 [FR] France .............................. 89 05469

[51] Int. Cl.$^5$ ............................ H04J 3/06; H04B 7/00
[52] U.S. Cl. ................................... 370/17; 370/100.1; 455/51.1; 455/56.1; 342/125
[58] Field of Search .................. 370/100.1, 104.1, 107, 370/108, 17, 13, 95.1, 95.2, 95.3; 375/107, 109; 455/51, 49, 54, 56; 342/118, 125, 356, 357, 450, 458, 463

[56] References Cited

U.S. PATENT DOCUMENTS

| | | | |
|---|---|---|---|
| 4,297,701 | 10/1981 | Henriques | 342/125 |
| 4,577,316 | 3/1986 | Schiff | 370/95.3 |
| 4,612,594 | 9/1986 | Yamaura et al. | 455/51 |
| 4,613,951 | 9/1986 | Chu | 370/108 |
| 4,694,453 | 9/1987 | Kobayashi et al. | 370/13 |
| 4,709,401 | 11/1987 | Akerberg | 455/51 |
| 4,800,560 | 1/1989 | Aoki et al. | 370/104.1 |
| 4,812,852 | 3/1989 | Bent et al. | 355/51 |

FOREIGN PATENT DOCUMENTS

0241565 10/1987 European Pat. Off. .
0286614 10/1988 European Pat. Off. .
2095516 9/1982 United Kingdom .

OTHER PUBLICATIONS

Proceedings IEEE Infocom'86, 5th Annual Conference, "Computer and Communications integration Design, Analysis, Management", Miami, Fla., 8-10 Avril 1986, IEEE, New-York, US; S. -Z. Su et al. : Time synchronisation and ranging for multihop mobile radio networks pp. 637-638, paragraphe 3.
ETSI, Recommendation GSM 04.08-Mobile Radio Interface Layer 3 Specification, Apr. 15, 1989, pp. 41-45, 192, 193 & 208.

Primary Examiner—Benedict V. Safourek
Assistant Examiner—Alpus H. Hsu
Attorney, Agent, or Firm—Griffin, Branigan & Butler

[57] ABSTRACT

A process for the pseudo-synchronization of a time multiplexing communication network comprises the steps of measuring a time shift TM in reception by a mobile station of synchronization signals from first and second fixed stations, measuring the propagation times t1 and t2 of a synchronization signal between the fixed stations and the mobile station, and calculating the transmission time shift TR between the synchronization signals in accordance with the relationship TR=TM+t1 −t2. The pseudo-synchronization process can also be employed for geographically locating a mobile station.

5 Claims, 1 Drawing Sheet

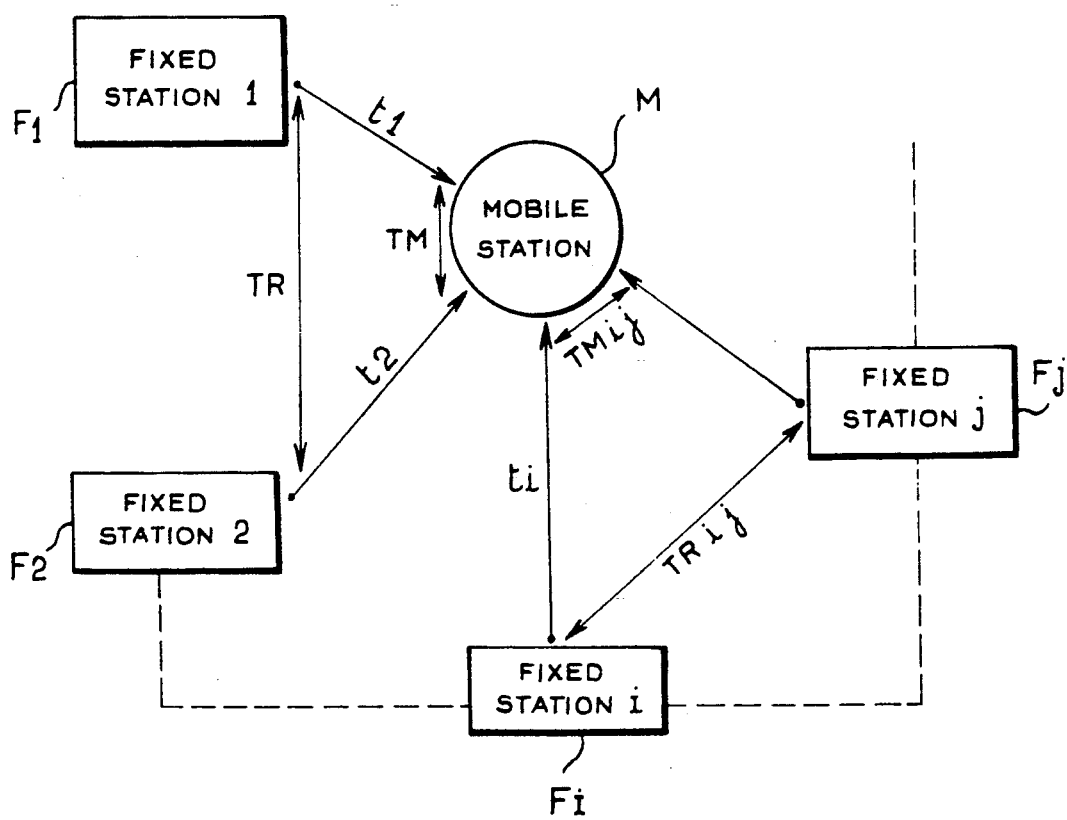

PROCESS FOR THE PSEUDO-SYNCHRONIZATION OF A TIME MULTIPLEXING COMMUNICATION NETWORK AND USES THEREOF

BACKGROUND OF THE INVENTION

The present invention concerns a process for the pseudo-synchronization of a time multiplexing communication network, and uses of that process for example in radiotelephony, for the synchronization of a mobile station with a fixed station upon transfer from a communication between the mobile station and a first fixed station to a communication between the mobile station and a second fixed station, or for geographically locating a mobile station either by fixed stations or by the mobile station itself.

There are time multiplexing radiocommunication networks which comprise a series of fixed stations which are individually synchronized with one or more mobile stations by means of timing signals. Time multiplexing assumes that each of the mobile stations which is in communication with a fixed station has time windows during which it can transmit its messages to the fixed station. In order to synchronize message transmissions by the mobile station with the moments at which the corresponding time window is available at the fixed station, the fixed station emits synchronization signals which permit it to measure the propagation time of a signal between that station and the mobile station and in consequence to control the transmission means of the mobile station.

In the most general case, the fixed stations are not synchronized with each other so that, when the mobile station moves and in consequence has to switch over from communication with one fixed station to communication with another fixed station, it is then necessary to effect synchronization of the mobile station with the new fixed station in order to be able to ensure communication therebetween in the proper time window. In another respect, in the case of a radiotelephony network, synchronization of the mobile station with the fixed station is achieved by passing the synchronization signals over the channel serving for the telephone communication itself, so the conversation between two users is interrupted during the synchronization time.

While synchronization of the fixed stations with each other has been envisaged, in order to be able to effect the transfer of a communication from one fixed station to another without interrupting an ongoing telephone conversation, synchronizing fixed stations with each other in that way is extremely burdensome and cannot be guaranteed to be achieved in a precise fashion in the case of a network covering a large area, by virtue of the possible accumulation of errors resulting from synchronization of the stations in a chain or sequential mode.

SUMMARY OF THE INVENTION

An object of the present invention is to provide a process for the pseudo-synchronization of a time multiplexing communication network, which makes it possible to reduce the time involved in synchronization of a mobile station with a fixed station.

Another object of the present invention is to provide a time multiplexing communication network pseudo-synchronization process which does not involve substantially increasing the installation and operating costs of the network.

Still another object of the invention is to provide a process for geographically locating a mobile station, which operates in a simple but reliable manner involving station pseudo-synchronization.

These and other objects are attained by a process for the pseudo-synchronization of a time multiplexing radiocommunication network comprising a series of fixed stations individually synchronized with mobile stations by means of timing signals, comprising the following steps: measuring the time shift or lag $TM_{ij}$ in reception by a mobile station of synchronization signals from first and second fixed stations, measuring the propagation time $t_i$, $t_j$ of a synchronization signal from the first and second fixed stations to the mobile station, and calculating the time shift or lag $TR_{ij}$ in transmission between the synchronization signals from the first and second fixed stations in accordance with the relationship: $TR_{ij} = TM_{ij} + t_i - t_j$.

Thus, using means which are already available in relation to a time multiplexing communication network, the invention provides information which makes it possible to ascertain the time shift in respect of the transmission of synchronization signals from a second fixed station with respect to a first fixed station.

In accordance with a first application of the pseudo-synchronization process according to the invention, the transmission time shift $TR$ is used in a process for the synchronization of a mobile station with a fixed station upon transfer of a communication between the mobile station and a first fixed station to a communication between the mobile station and a second fixed station, comprising the following steps: transmitting to the mobile station the previously calculated transmission time shift $TR_{ij}$ between the synchronization signals from the first and second fixed stations and the propagation time $t_i$ of the synchronization signal from the first fixed station to the mobile station, measuring the reception time shift $TM_{ij}$ between the synchronization signals from the first and second fixed stations, calculating the propagation time $t_j$ of the synchronization signal from the second fixed station to the mobile station, in accordance with the relationship: $t_j = t_i - TR_{ij} + TM_{ij}$, and controlling the transmission from the mobile station to the second fixed station in dependence on the propagation time $t_j$ and the transmission time shift $TR_{ij}$.

Thus the mobile station determines the time at which it must transmit towards the second fixed station without waiting until it has received the first synchronization signal from the second fixed station.

Preferably the process for the synchronization of a mobile station with a fixed station, according to the invention, further comprises the following steps: sending to the second fixed station a signal $TM_{ij} + t_i$ which is equal to the sum of the measured reception time shift $TM_{ij}$ and the received propagation time $t_i$, measuring at the second fixed station the propagation time $t_j$ of the synchronization signal from the second fixed station to the mobile station, subtracting same from the received sum and storing the result $TR_{ij}$ obtained.

Thus, in each transfer of communication between two fixed stations, the information relating to the transmission time shift $TR$ is updated in one of the fixed stations in order to use it in the following transfer in the opposite direction in conjunction with the movements of one of the mobile stations in the network.

In accordance with another use of the invention, the process for the pseudo-synchronization of the network is used in a process for geographically locating a mobile station, comprising the following steps: transmitting to a first fixed station a value measured at the mobile station in respect of the reception time shift TMij of the synchronization signals from the first and at least one second fixed station, measuring at the first fixed station the propagation time ti of the synchronization signal from the first fixed station to the mobile station, calculating at the first fixed station the propagation time tj of the synchronization signal from the second fixed stations to the mobile station using the transmission time shift TRij stored from a preceding calculation, in accordance with the relationship: tj=TMij+ti−TRij, and calculating the position of the mobile station from the propagation times ti and tj and geographical co-ordinates of the first fixed station and the second fixed stations.

Thus, knowing the position of the mobile station makes it possible to take decisions such as for example the time of transfer of the telephone communication between a fixed station and the mobile station, to a telephone communication between another fixed station and the mobile station.

In accordance with yet another use of the pseudo-synchronization process according to the invention, it is used in a process for geographically locating a mobile station by itself comprising the following steps: transmitting to the mobile station the geographical co-ordinates of a series of fixed stations and the transmission time shifts TRij of the fixed stations between each other, measuring at the mobile station the reception time shifts TMij of the synchronization signals from pairs of fixed stations, calculating the differences in propagation times ti−tj from the fixed stations to the mobile station, in accordance with the relationship: ti−tj=TRij−TMij, and calculating the position of the mobile station from the geographical co-ordinates of the fixed stations and the propagation time differences.

Thus the mobile station can by itself determine its geographical location and use that information, for example for centering a map in the framework of a guide arrangement assisted by automatic cartography.

Other objects, features and advantages of the invention will be apparent from the following description of preferred embodiments of the invention.

BRIEF DESCRIPTION OF THE DRAWING

The single FIGURE of the accompanying drawing is a diagrammatic view of part of a time multiplexing radiocommunication network operating in accordance with the invention.

DESCRIPTION OF THE PREFERRED EMBODIMENTS

In per se known manner the network comprises a series of fixed stations F1, F2 ... Fi ... Fj ..., which are distributed over an area which is to be covered by the network. The network also comprises a series of mobile stations M, for example vehicles fitted with a radiotelephone, only one thereof being shown in the drawing.

Each of the fixed stations periodically transmits synchronization signals whose time for propagation to a mobile station is respectively indicated at t1, t2 ..., ti ... tj ....

When a communication is established for the transmission of a telephone conversation, the mobile station is in communication with one of the fixed stations and the communication is transferred to another fixed station when the need therefor arises as a result of movements of the mobile station, the time of the transfer being determined in known manner by the fixed station with which the mobile station is communicating. When the mobile station is in communication with a fixed station, it receives the synchronization signals therefrom and immediately re-transmits to that station a response signal so that the fixed station determines the time involved in propagation of the signal to the mobile station and informs the mobile station of that propagation time in order to advance or retard the time of transmission of the telephone message transmitted by the mobile station, in order that the telephone message is received by the fixed station at the moment at which it has a reception time window allocated to the mobile station in question. In parallel therewith, although the other fixed stations also transmit synchronization signals to the mobile station, they do not receive any return signal from the mobile station and they are therefore not able to measure either the time involved in propagation of their own synchronization signal to the mobile station, or the time shift or lapse which separates them from the adjoining fixed stations.

In the existing systems, when a communication between a fixed station, for example F1, and the mobile station, M is transferred in order for communication to be estabhlished between another fixed station, for example F2, and the mobile station, it is therefore necessary to wait for F2 to have calculated the propagation time t2 and to have notified the mobile station M thereof, before it is possible to continue with transmission of the telephone message. Although that interruption is very short (approximately a quarter of a second), it is nonetheless perceptible from the point of view of users.

The process for the pseudo-synchronization of the fixed stations will now be described simultaneously with the process for the synchronization of a mobile station with a fixed station when transferring a communication, by virtue of the joint operation of those two processes in the preferred embodiment. The following description will be set forth in relation to the transfer of a communication from the fixed station F1 to the fixed station F2 although that transfer may take place in the same manner between any two stations of the network, which are disposed in the proximity of the mobile station.

In accordance with the invention it is provided that from time to time the mobile station goes into a mode of listening for synchronization signals coming from the neighbouring fixed stations to which a transfer may occur. It will be noted that that listening mode may be for an extremely short period of time since, from the point of view of the mobile station, and it involves simply noting the movment of reception of a synchronization signal coming from a fixed station with which it is not in communication, and not receiving a message informing it of the time involved in propagation of that synchronization signal.

In the situation envisaged herein, the mobile station M is in communication with the fixed station F1 and from time to time goes into the mode of listening for the synchronization signal coming from the fixed station F2. It will be appreciated that in parallel it receives the synchronisation signal from the fixed station F1. The mobile station M thus effects measurement of the reception time shift or lag TM between the synchronization signals coming from the station F1 and the synchronization signals coming from the station F2. That value of TM is updated each time that the measurement operation is performed so that it is up-to-date when a communication is transferred from F1 to F2.

Upon transfer of the communication from F1 to F2, the fixed station F1 sends a transfer message to the mobile station, indicating to it, on the one hand, the new fixed station with which the mobile station is going to be communicating, and, on the other hand, the transmission time shift or lag TR between the moments of transmission of the synchronization signals by the stations F1 and F2, that transmission time shift TR having been calculated by the station F1 at a preceding transfer, as will be seen hereinafter. As the mobile station M has in its memory the parameter TM which it measures from time to time, t1 which has been periodically communicated to the mobile station by the station F1, and TR which is communicated to the mobile station by the station F1 at the moment of the transfer, the mobile station M is capable of calculating t2 by means of the relationship $t2 = TM + t1 - TR$, and therefore determining the moment of transmission of the first telephone message to the station F2 without waiting to receive from F2 the information concerning the precise value of the time t2. Once the communication has been established, the fixed station F2 sends to the mobile station M the information concerning the actual value of t2 and a correction is then progressively effected in accordance with the usual cycle.

Simultaneously with the communication being switched over to the new fixed station F2, the mobile station M transmits to the fixed station F2 the value of the reception time shift or lag TM and the value of the last propagation time t1 of which it was aware. As it is in a position to measure the propagation time t2, the fixed station F2 can therefore calculate the transmission time shift TR at the moment of the transfer by applying the relationship $TR = TM + t1 - t2$, and store that value in respect of the transmission time shift TR in order subsequently to inform a mobile station thereof when effecting a transfer of communication from the fixed station F2 to the fixed station F1. In practice, in order to minimize the time for which the telephone communication is interrupted, the mobile station M preferably sends the fixed station F2 a single message giving it the value $TM + t1$.

It is found that, in the preferred embodiment of the invention, a fixed station is informed about the transmission time shift TR in relation to another fixed station, only in the event of a transfer of communication from that fixed station. That embodiment of the invention is preferred as it avoids excessively frequent interruption in the telephone conversation. In a situation in which the value of the transmission time shift TR is too old to permit synchronization which can be anticipated as being effective, the network reverts to the usual procedure which involves waiting for the synchronization signal from the new fixed station.

The pseudo-synchronization process according to the invention can also be used in a process for geographically locating a mobile station by a fixed station. In that case the mobile station transmits to a first fixed station, for example the fixed station Fi, a value measured at the mobile station in respect of the reception time shift $TM_{ij}$ of the synchronization signals coming from the fixed station Fi and a second fixed station Fj.

In addition, the procedure comprises measuring at the fixed station Fi the time ti involved in propagation of the synchronization signal from the fixed station Fi to the mobile station M. It is then possible at the fixed station Fi to calculate the value tj of the propagation time of the synchronization signal from the fixed station Fj to the mobile station M, using the transmission time shift $TR_{ij}$ stored at the fixed station Fi from a preceding calculation, in accordance with the following relationship: $tj = TM_{ij} + ti - TR_{ij}$, and then calculating the geographical position of the mobile station, employing the usual algorithms for locating a mobile point on the basis of knowledge of the co-ordinates of two fixed points and the distance separating those fixed points from the mobile point. In order to achieve a greater degree of precision in locating the mobile station, the distance of the mobile station with respect to more than two fixed stations is calculated by reiterating the above process. Knowledge of the position of the mobile station can be used in particular for deciding on the time of transfer of a communication from one fixed station to another fixed station.

It will be appreciated that the invention is not limited to the embodiments described and that modifications may be made therein without thereby departing from the scope of the invention. In particular the combination of geographical location and radiocommunications may be used for a service for searching for lost persons who simply carry a small portable transmitter-receiver which makes it possible to locate them by using the stations which are normally employed for radiocommuncation purposes.

We claim:

1. A process for the pseudo-synchronization of a time multiplexing communication network comprising a series of fixed stations ... Fi ... Fj ... individually and serially synchronized with mobile stations by means of synchronization signals, including the following steps: measuring at a mobile station M the time shift $TM_{ij}$ in reception by said mobile station M of synchronization signals from a first fixed station Fi and a second fixed station Fj, measuring at the first fixed station Fi the propagation time ti of a synchronization signal from the first fixed station to the mobile station M, propagation time ti from the first fixed station Fi to the mobile station M, transmitting the time shift $TM_{ij}$ and the propagation time ti from the mobile station M to the second fixed station Fj, measuring at the second fixed station Fj the propagation time tj of a synchronization signal from the second fixed station Fj to the mobile station M, and calculating and storing at the second fixed station the time shift $TR_{ij}$ in transmission between the synchronization signals from the first and second fixed stations in accordance with the relationship: $TR_{ij} = TM_{ij} + ti - tj$.

2. A process for the synchronization of a mobile station with the fixed station when transferring a communication between a mobile station and a first of the fixed stations to a communication between the mobile station and a second of the fixed stations in which the pseudo-synchronization process as set forth in claim 1 has been previously conducted, including the following steps: transmitting to the mobile station the previously calculated transmission time shift $TR_{ij}$ between the synchronization signals from the first and second fixed stations and the propagation time ti of the synchronization signal from the first fixed station to the mobile station, measuring at the mobile station a reception time shift $TM_{ij}$ between the synchronization signals from the first and second fixed stations, calculating at the mobile station the propagation time tj of the synchronization signal from the second fixed station to the mobile station, in accordance with the relationship: $tj = ti - TRij + TMij$ and controlling at the mobile station transmission from the mobile station to the second fixed station in dependence on the propagation time tj and the transmission time shift TRij.

3. A process as set forth in claim 2 which further comprises the step of sending from the mobile station to the second fixed station a signal $TMij + ti$ equal to the sum of the measured reception time shift TMij and the received propagation time ti, measuring at the second fixed station the propagation time tj of the synchronization signal from the second fixed station to the mobile station, subtracting tj from the received sum, and storing the result TRij so obtained.

4. A process for geographically locating a mobile station of a time multiplexing communication network in which a pseudo-synchronization process as set forth in claim 1 has been previously conducted, including the following steps: transmitting to a first fixed station a value measured at the mobile station of the reception time shift TMij in respect of the synchronization signals from a first station and at least one second fixed station, measuring at the first fixed station the propagation time ti of the synchronization signal from the first fixed station to the mobile station, calculating at the first fixed station the propagation time tj of the synchronization signal from said at least one second fixed station to the mobile station using the transmission time shift TRij stored in a preceding calculation, in accordance with the relationship: $tj = TMij + ti - TRij$, and calculating the position of the mobile station from the propagation times ti and tj and geographical co-ordinates of the first fixed station and said at least one second fixed station.

5. A process for geographically locating a mobile station of a time multiplexing communication network in which the synchronization process of claim 1 has previously been conducted including the following steps: transmitting to a mobile station the geographical co-ordinates of a plurality of fixed stations and the transmission time shifts TRij of the fixed stations relative to each other, measuring at the mobile station the reception time shifts TMij of the synchronization signals from respective pairs of fixed stations, calculating the differences in propagation times $ti - tj$ from the fixed stations to the mobile station in accordance with the relationship $ti - tj = TRij - TMij$, and calculating the position of the mobile station from the geographical co-ordinates of the fixed stations and the propagation time differences.

* * * * *